US009851872B2

(12) United States Patent
Kannan et al.

(10) Patent No.: US 9,851,872 B2
(45) Date of Patent: *Dec. 26, 2017

(54) SLIDER AND HISTORY FIELD FOR SMART CHAT SESSIONS

(71) Applicant: 24/7 Customer, Inc., Campbell, CA (US)

(72) Inventors: Pallipuram V. Kannan, Los Gatos, CA (US); Mohit Jain, Bangalore (IN)

(73) Assignee: 24/7 CUSTOMER, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/149,035

(22) Filed: May 6, 2016

(65) Prior Publication Data

US 2016/0253054 A1 Sep. 1, 2016

Related U.S. Application Data

(63) Continuation of application No. 14/565,152, filed on Dec. 9, 2014, which is a continuation of application
(Continued)

(51) Int. Cl.
| | |
|---|---|
| *G06F 3/048* | (2013.01) |
| *G06F 3/0482* | (2013.01) |
| *G06F 3/0481* | (2013.01) |
| *G06Q 10/10* | (2012.01) |
| *G06Q 30/00* | (2012.01) |

(Continued)

(52) U.S. Cl.
CPC .......... *G06F 3/0482* (2013.01); *G06F 3/0481* (2013.01); *G06F 3/04817* (2013.01); *G06F 3/167* (2013.01); *G06Q 10/107* (2013.01); *G06Q 30/016* (2013.01); *H04L 51/04* (2013.01); *G06F 3/0488* (2013.01)

(58) Field of Classification Search
CPC ....... H04L 51/046; H04L 51/04; H04L 51/32; H04L 65/403; G06F 3/04842; G06F 3/0482; G06F 3/0481; G06F 3/0488
See application file for complete search history.

(56) References Cited

U.S. PATENT DOCUMENTS

| | | | | |
|---|---|---|---|---|
| RE37,431 E | * | 10/2001 | Lanier ...................... | G06N 5/04 706/11 |
| 6,542,163 B2 | * | 4/2003 | Gorbet .................. | G06F 9/4446 715/708 |

(Continued)

*Primary Examiner* — Tuyetlien T Tran
(74) *Attorney, Agent, or Firm* — Perkins Coie LLP

(57) ABSTRACT

A context sensitive slider content area provides a slide out mechanism that is automatically actuated when additional information is needed during a chat session between an agent and a visitor, e.g. where a pre-chat and/or exit form is to be completed. The context sensitive slide out content area also provides problem resolution information to the visitor to help in solving problems, e.g. the top five problems; and also provides a self-service step-by-step wizard. A history section is provided with which the visitor can track back all previous steps carried out within the smart client. A history bar provides an iconic representation of all previous activities. A technique is also disclosed for executing various actions, such as form filling or requests for additional services, in a chat session.

14 Claims, 14 Drawing Sheets

Related U.S. Application Data

No. 13/107,655, filed on May 13, 2011, now Pat. No. 8,935,619.

(60) Provisional application No. 61/366,843, filed on Jul. 22, 2010.

(51) Int. Cl.
*G06F 3/16* (2006.01)
*H04L 12/58* (2006.01)
*G06F 3/0488* (2013.01)

(56) References Cited

U.S. PATENT DOCUMENTS

| | | | |
|---|---|---|---|
| 6,727,916 B1 | 4/2004 | Ballard | |
| 6,999,990 B1* | 2/2006 | Sullivan | G06F 9/4446 709/204 |
| 7,603,413 B1* | 10/2009 | Herold | G06Q 10/10 455/466 |
| 7,606,909 B1* | 10/2009 | Ely | G06Q 10/02 379/93.09 |
| 8,930,465 B2* | 1/2015 | Jaffer | G06F 9/4443 709/202 |
| 2002/0095462 A1 | 7/2002 | Beck et al. | |
| 2002/0133392 A1* | 9/2002 | Angel | G06F 17/3089 705/7.39 |
| 2004/0148347 A1* | 7/2004 | Appelman | H04L 12/581 709/204 |
| 2005/0100159 A1* | 5/2005 | Fink | H04M 3/5191 379/265.11 |
| 2005/0102358 A1 | 5/2005 | Gold et al. | |
| 2005/0132298 A1* | 6/2005 | Lueckhoff | G06Q 30/02 715/758 |
| 2005/0152529 A1* | 7/2005 | Kumar | H04M 3/5183 379/265.02 |
| 2005/0193055 A1* | 9/2005 | Angel | G06Q 30/02 709/202 |
| 2005/0195966 A1* | 9/2005 | Adar | G06Q 30/02 379/266.08 |
| 2006/0165066 A1* | 7/2006 | Campbell | H04M 3/5125 370/352 |
| 2007/0061412 A1* | 3/2007 | Karidi | G06F 17/3089 709/217 |
| 2007/0220441 A1* | 9/2007 | Melton | G06F 17/3089 715/781 |
| 2007/0245249 A1 | 10/2007 | Weisberg | |
| 2007/0265873 A1* | 11/2007 | Sheth | G06Q 30/016 705/304 |
| 2008/0034309 A1* | 2/2008 | Louch | G06F 3/0481 715/766 |
| 2008/0115068 A1* | 5/2008 | Smith | H04L 12/1813 715/758 |
| 2008/0126949 A1* | 5/2008 | Sharma | G06Q 10/109 715/751 |
| 2008/0133659 A1* | 6/2008 | Aldrey | G06Q 30/0601 709/204 |
| 2008/0172574 A1* | 7/2008 | Fisher | G06Q 10/06 714/25 |
| 2008/0177600 A1* | 7/2008 | McCarthy | G06Q 10/0639 705/7.33 |
| 2008/0215976 A1* | 9/2008 | Bierner | G06Q 99/00 715/708 |
| 2008/0229215 A1* | 9/2008 | Baron | G06N 3/006 715/751 |
| 2009/0254840 A1* | 10/2009 | Churchill | G06F 3/0481 715/753 |
| 2009/0282106 A1* | 11/2009 | Jaffer | G06Q 10/00 709/206 |
| 2009/0282421 A1* | 11/2009 | Jaffer | G06F 9/4443 719/317 |
| 2010/0223261 A1* | 9/2010 | Sarkar | G06F 17/30705 707/726 |
| 2010/0228777 A1* | 9/2010 | Imig | G06F 17/30699 707/772 |
| 2010/0287494 A1* | 11/2010 | Ording | G06F 3/0481 715/790 |
| 2011/0137884 A1* | 6/2011 | Anantharajan | G06F 17/30637 707/708 |

\* cited by examiner

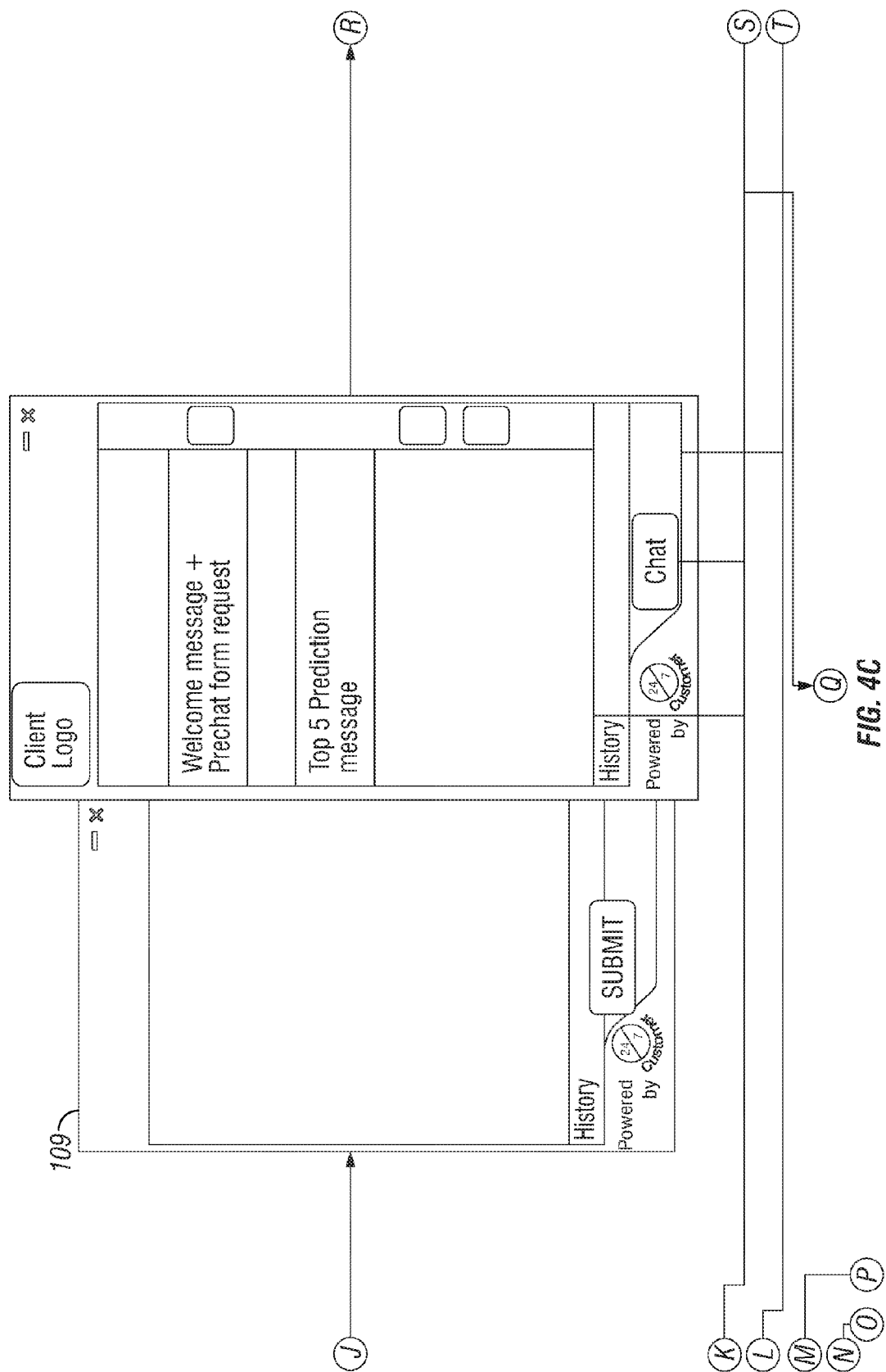

SLIDER AND HISTORY FIELD FOR SMART CHAT SESSIONS

CROSS REFERENCE TO RELATED APPLICATIONS

This application is a continuation of U.S. patent application Ser. No. 14/565,152, filed Dec. 9, 2014, which is a continuation of U.S. patent application Ser. No. 13/107,655, filed May 13, 2011, now U.S. Pat. No. 8,935,619, which claims priority to provisional U.S. patent application Ser. No. 61/366,843, filed Jul. 22, 2010, each of which are incorporated herein in its entirety by this reference thereto.

BACKGROUND OF THE INVENTION

Technical Field

The invention relates to on-line customer service. More particularly, the invention relates to a slider and history field for a smart chat session.

Description of the Background Art

Online chat can refer to any kind of communication over the Internet, but is primarily meant to refer to direct one-on-one chat or text-based group chat (formally also known as synchronous conferencing), using tools such as instant messengers, Internet Relay Chat, talkers, and possibly MUDs. The expression online chat comes from the word chat which means "informal conversation."

Currently, a visitor to an on-line service can engage in a chat session pursuant to such visit. For example, FIG. 1 is a screen shot showing a chat session on a conventional PC display; and FIG. 2 is a screen shot showing a chat session on a conventional smart phone display. Unfortunately, a chat session is confined to the immediate chat window and thus limits the types of interaction available as part of the chat. This problem is especially pronounced in a device having a small display, such as that of the smart phone shown in FIG. 2.

A further problem arises in tracking a chat session flow, for example during a series of steps in a procedure, where a visitor or agent might want to refer back to a specific action.

Finally, there is no method for executing various actions, such as form filling or requests for additional services, in a chat session other than during the actual chat dialog.

It would be advantageous to provide improvements in chat session technology that address the above problems in conventional chat techniques.

SUMMARY OF THE INVENTION

In an embodiment of the invention, a context sensitive slider content area provides a slide out mechanism that is automatically actuated when additional information is needed during a chat session between an agent and a visitor, e.g. where a pre-chat and/or exit form is to be completed. The context sensitive slide out content area also provides problem resolution information to the visitor to help in solving problems, e.g. the top five problems; and also provides a self-service step-by-step wizard. While the chat agent is interacting with the visitor, the agent can trigger the slide area, via an agent console, as and when information and/or forms are to be sent to the visitor.

An embodiment of the invention includes a history section with which the visitor can track back all previous steps carried out within the smart client. A history bar provides an iconic representation of all previous activities.

A further embodiment of the invention provides a technique for executing various actions, such as form filling or requests for additional services, in a chat session.

DETAILED DESCRIPTION OF THE INVENTION

In an embodiment of the invention, a context sensitive slider content area provides a slide out mechanism that is automatically actuated when additional information is needed during a chat session between an agent and a visitor, e.g. where a pre-chat and/or exit form is to be completed. The context sensitive slide out content area also provides problem resolution information to the visitor to help in solving problems, e.g. the top five problems; and also provides a self-service step-by-step wizard. While the chat agent is interacting with the visitor, the agent can trigger the slide area, via an agent console, as and when information and/or forms are to be sent to the visitor.

An embodiment of the invention includes a history section with which the visitor can track back all previous steps carried out within the smart client. A history bar provides an iconic representation of all previous activities.

A further embodiment of the invention provides a technique for executing various actions, such as form filling or requests for additional services, in a chat session.

Figure 3A:
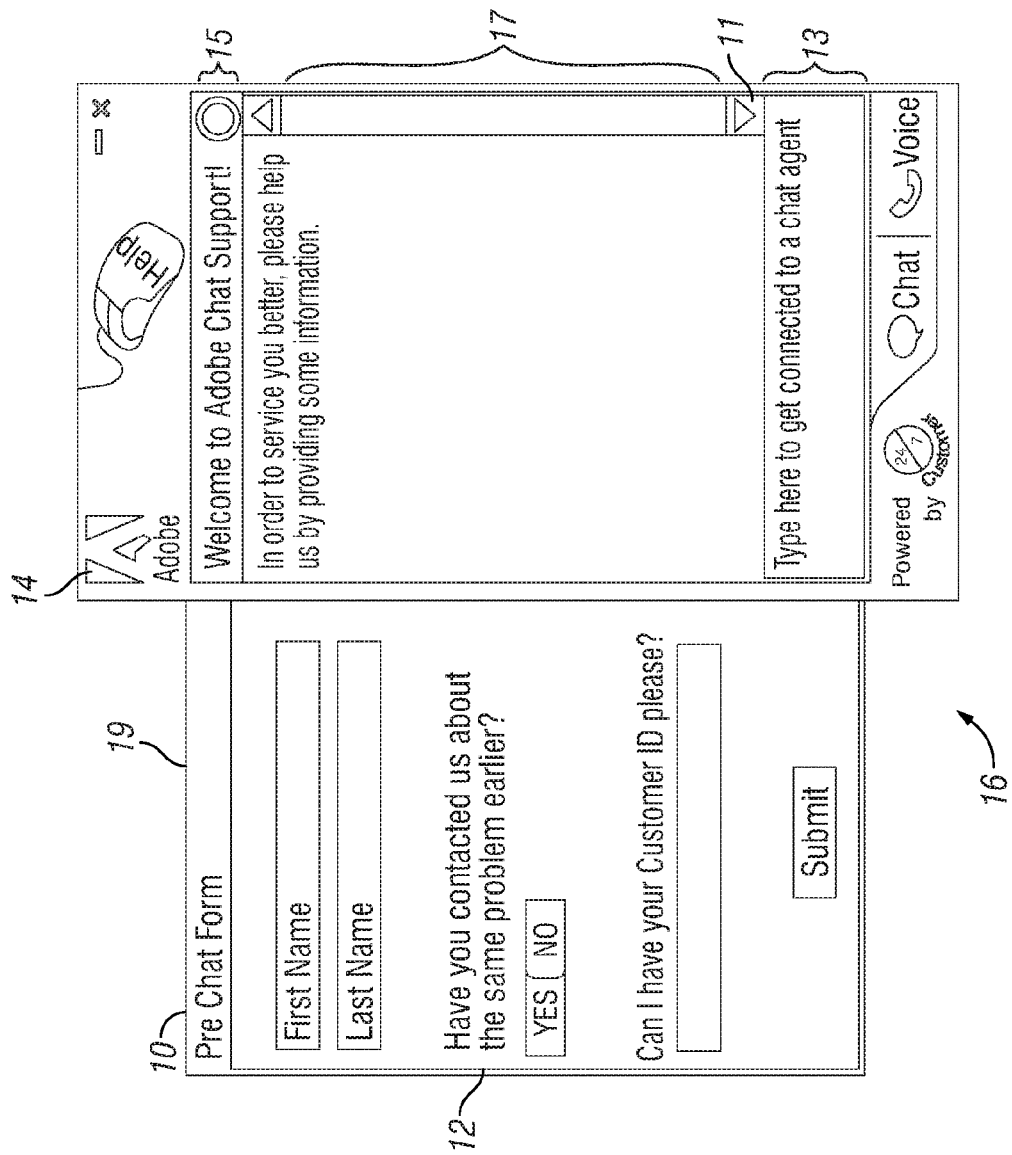
FIGS. 3A and 3B are schematic diagrams showing the layout of a smart client wizard according to the invention.
Figure 3B:
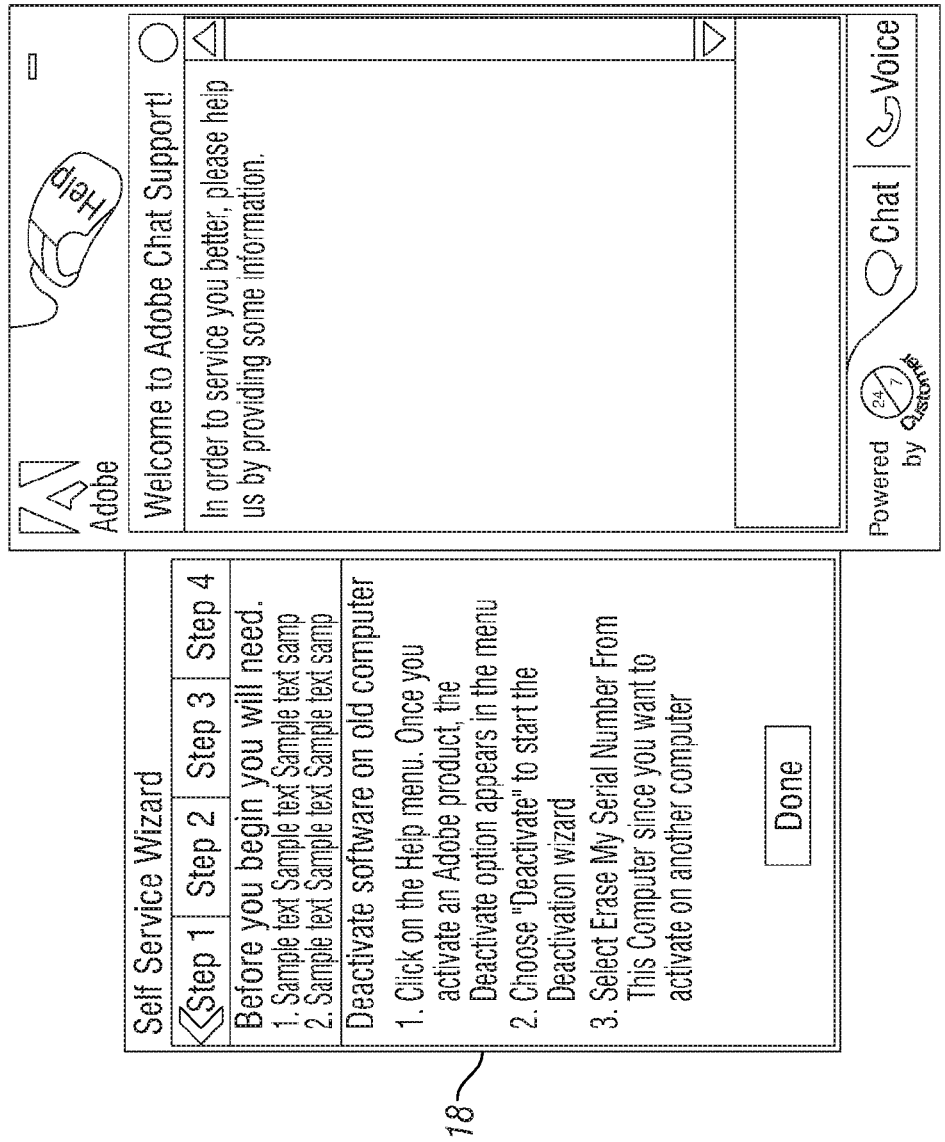

FIGS. 3A and 3B are schematic diagrams showing the layout of a smart client wizard according to the invention.

In FIG. 3A, a smart phone 16 is shown having a branding area 14 for displaying a client logo. An agent active button 15 shows the chat area status, i.e. connected or standing by. A widget content area 17 is provided that mentions all previous activities completed by the visitor. This can include a history section with which the visitor can track back all previous steps carried out within the smart client. A history bar 11 provides an iconic representation of all previous activities. A chat area 13 is provided in case the visitor is not interested in self service. Accordingly, the visitor can start directly typing into the chat area and is automatically connected to the chat queue.

A content sensitive pre-chat form 10, based on click stream data, provides relevant questions which, in turn, assist the agent in assisting the visitor. A context sensitive slider content area 12 provides a slide out mechanism that is automatically actuated when additional information is needed, e.g. where a pre-chat and/or exit form is to be completed. In FIG. 3A, a pre-chat form 19 is shown that the visitor completes before beginning a chat session.

The context sensitive slide out content area also provides problem resolution information to the visitor to help in solving problems, e.g. the top five problems; and also provides a self-service step-buy-step wizard. While the chat agent is interacting with the visitor, the agent can trigger the slide area, via an agent console, as and when information and/or forms are to be sent to the visitor.

In FIG. 3B, for example, the context sensitive slide out content area is shown providing a self service wizard 18. Those skilled in the art will appreciate that any number of context sensitive slider content areas can be provided at any point in a visitor interaction with a customer service facility.

Figure 1:
FIG. 1 is a screen shot showing a chat session on a conventional PC display.
Figure 2:
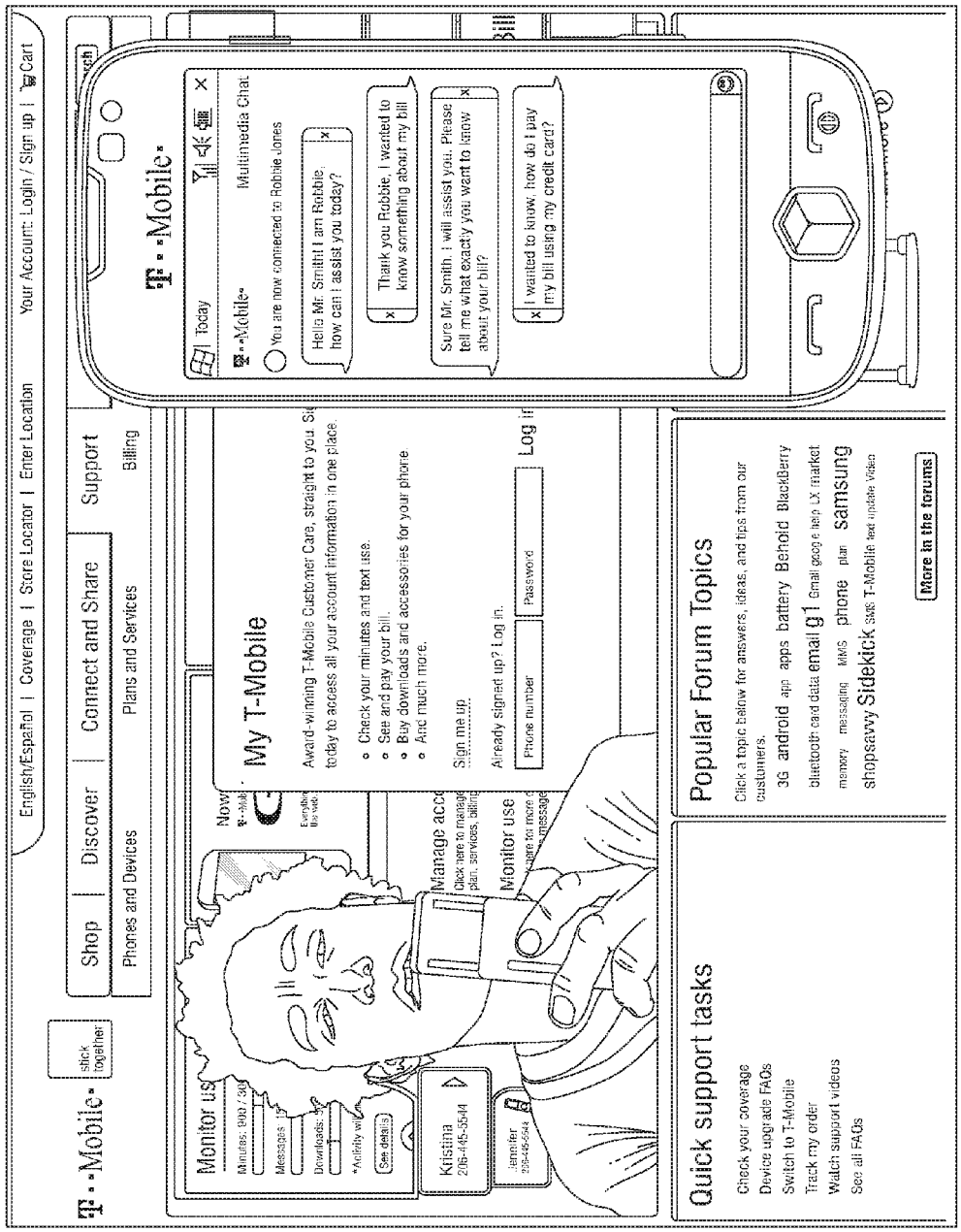
FIG. 2 is a screen shot showing a chat session on a conventional smart phone display.

As discussed above, FIG. 1 is a screen shot showing a chat session on a conventional PC display; and FIG. 2 is a screen shot showing a chat session on a smart phone display. In each case, there is no facility for the agent and/or the visitor to side step the chart session screen itself to provide or receive additional information. In the example of FIG. 1, in accordance with an embodiment of the invention, the agent could slide out a copy of the visitor's bill and the agent and visitor could discuss the bill in the chat area, while at the same time viewing the bill. Likewise, in the example of FIG. 2, in accordance with an embodiment of the invention, the agent could slide out a copy of the bill paying procedures requested by the visitor, and the session could move between the chat area and the slide out area.

Figure 4A:
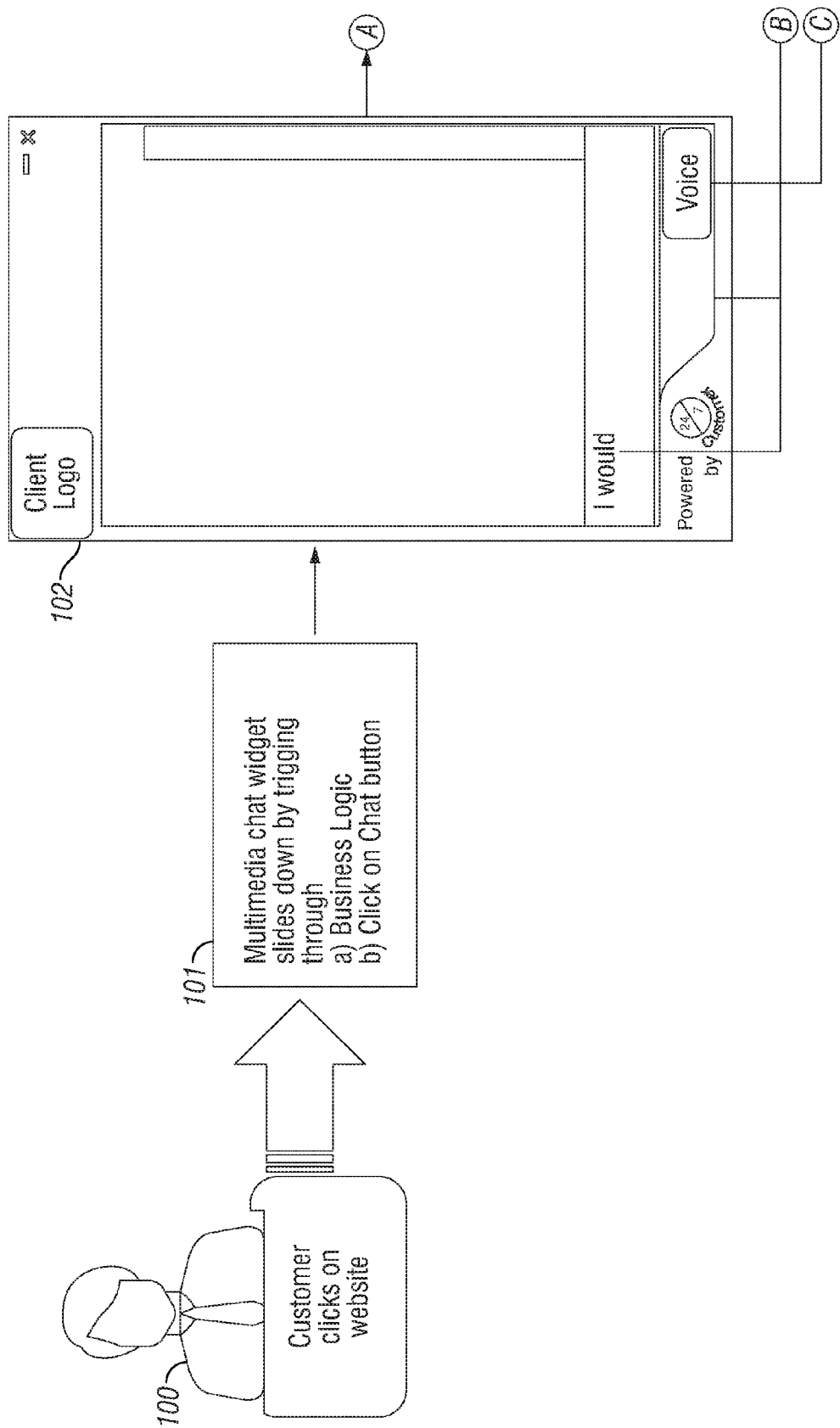
FIGS. 4A-4C are flow diagrams showing a process flow for a smart chat session according to the invention.
Figure 4A:
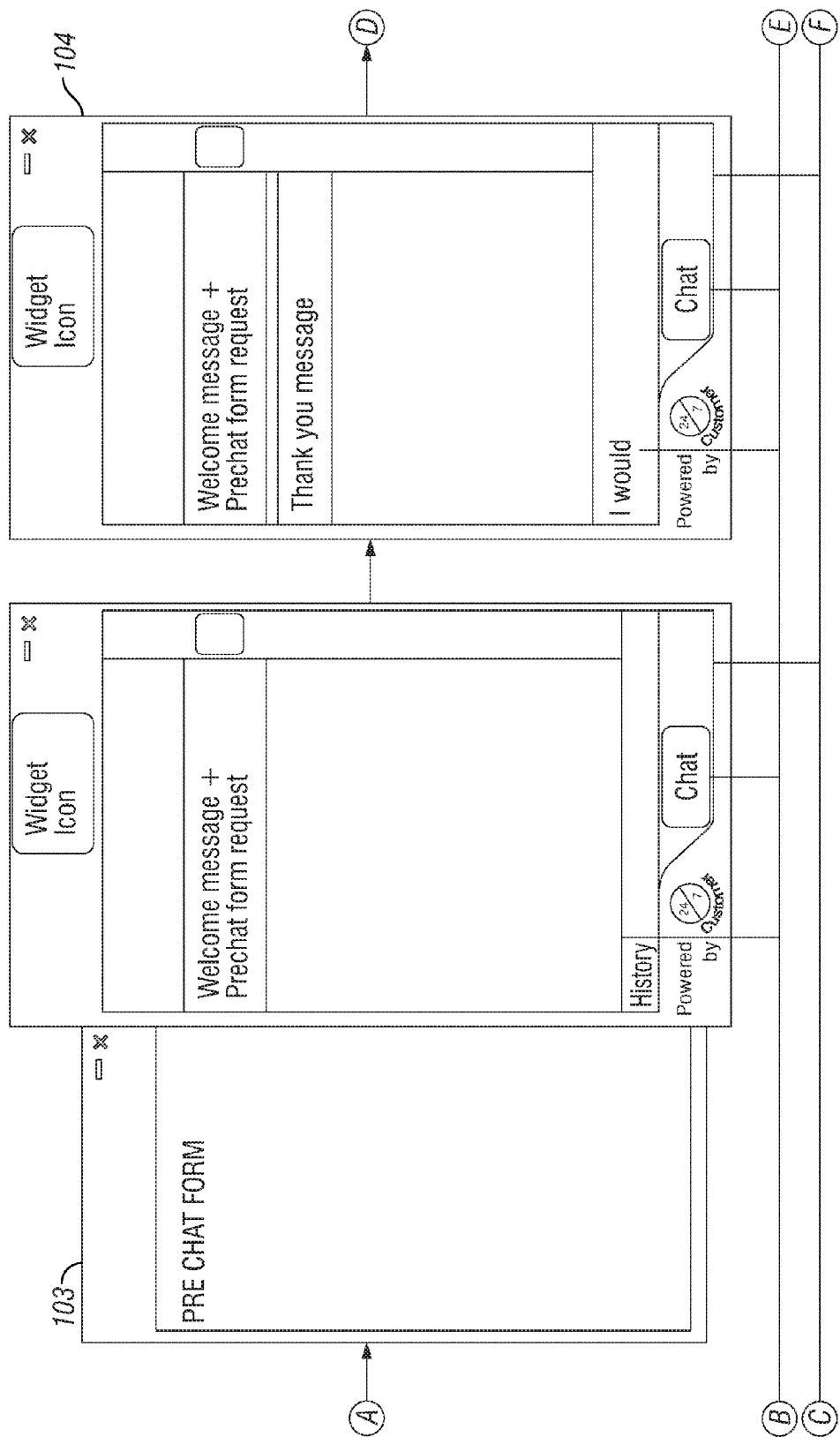
Figure 4B:
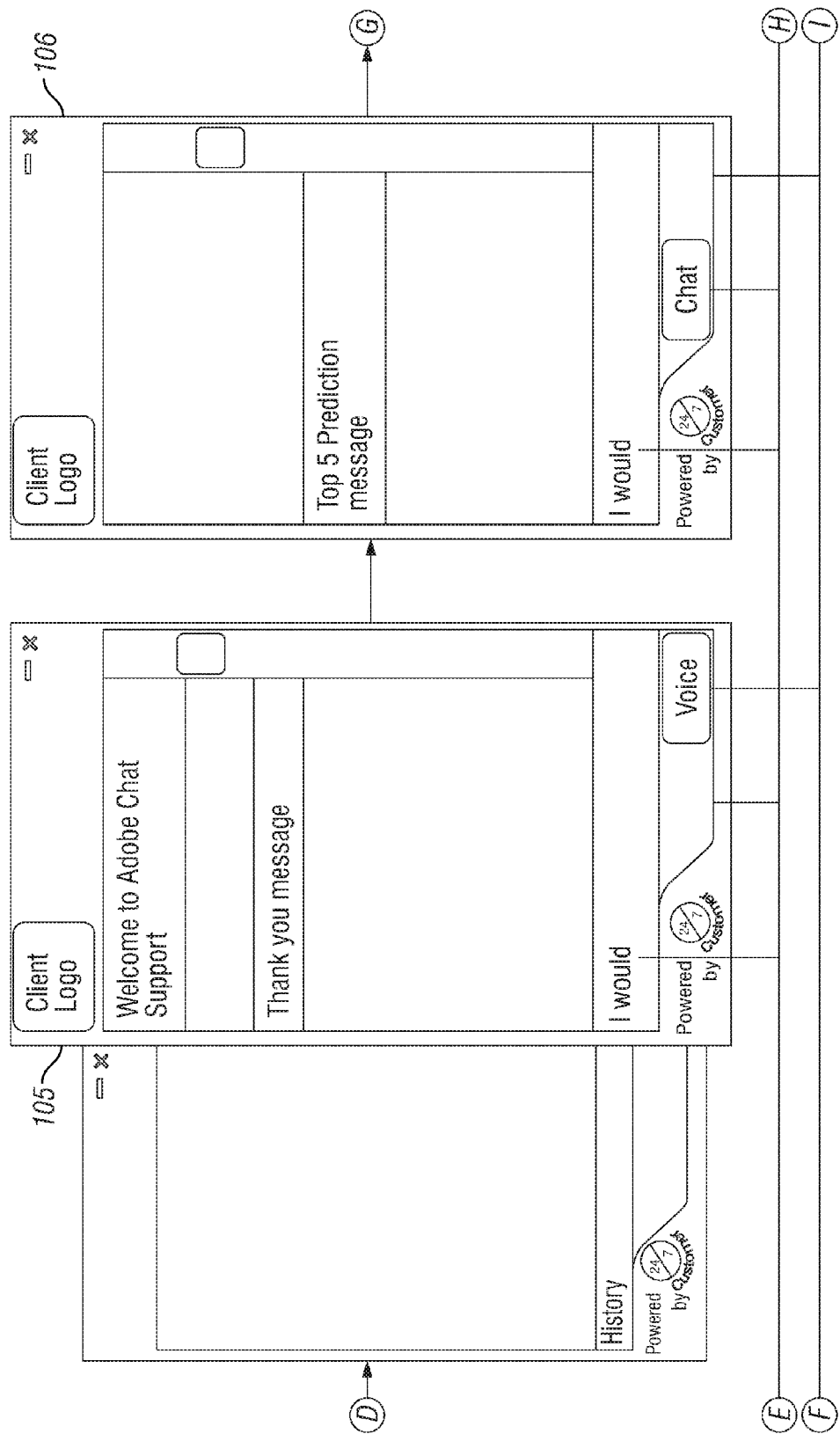
Figure 4B:
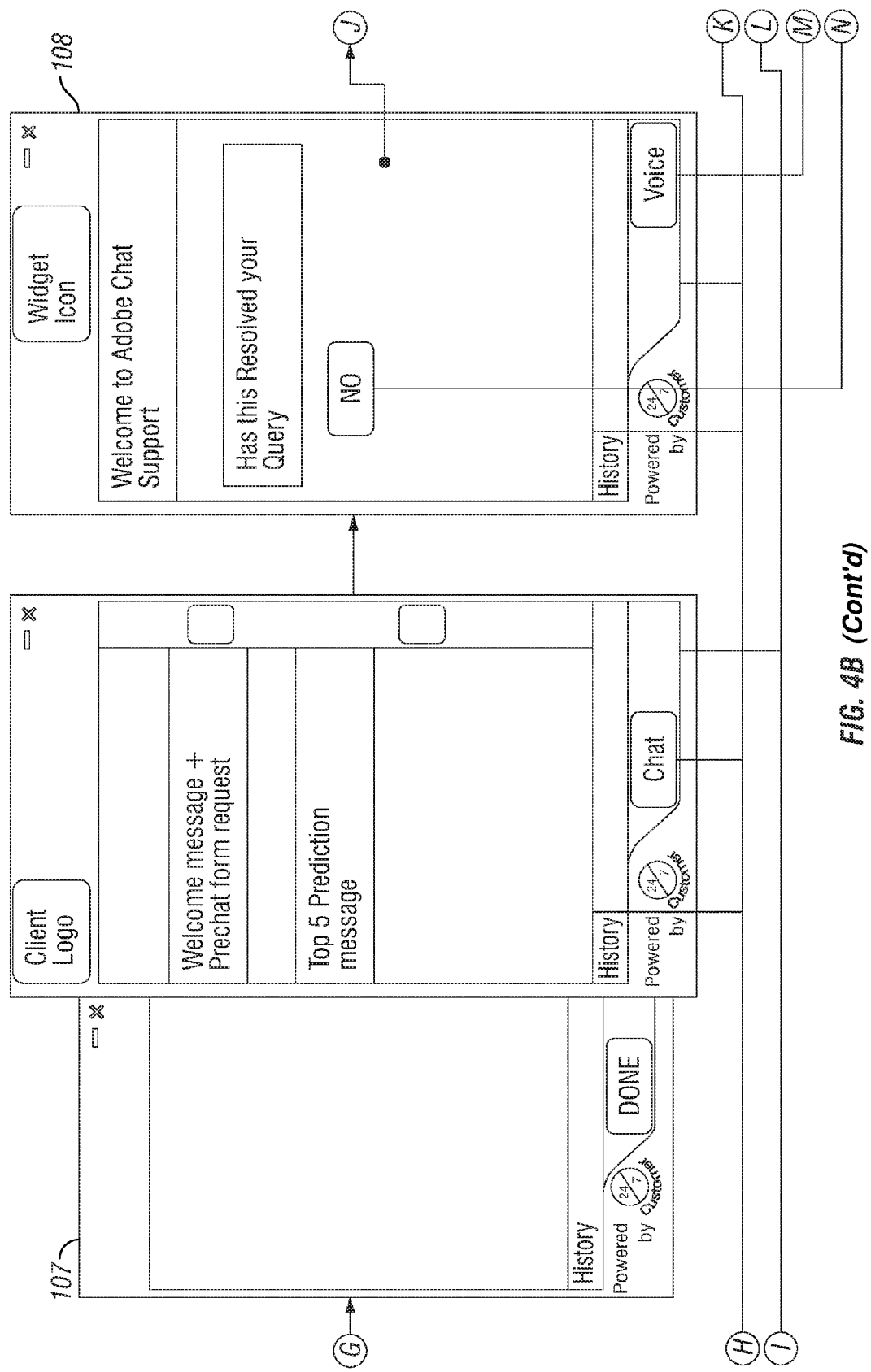
Figure 4C:
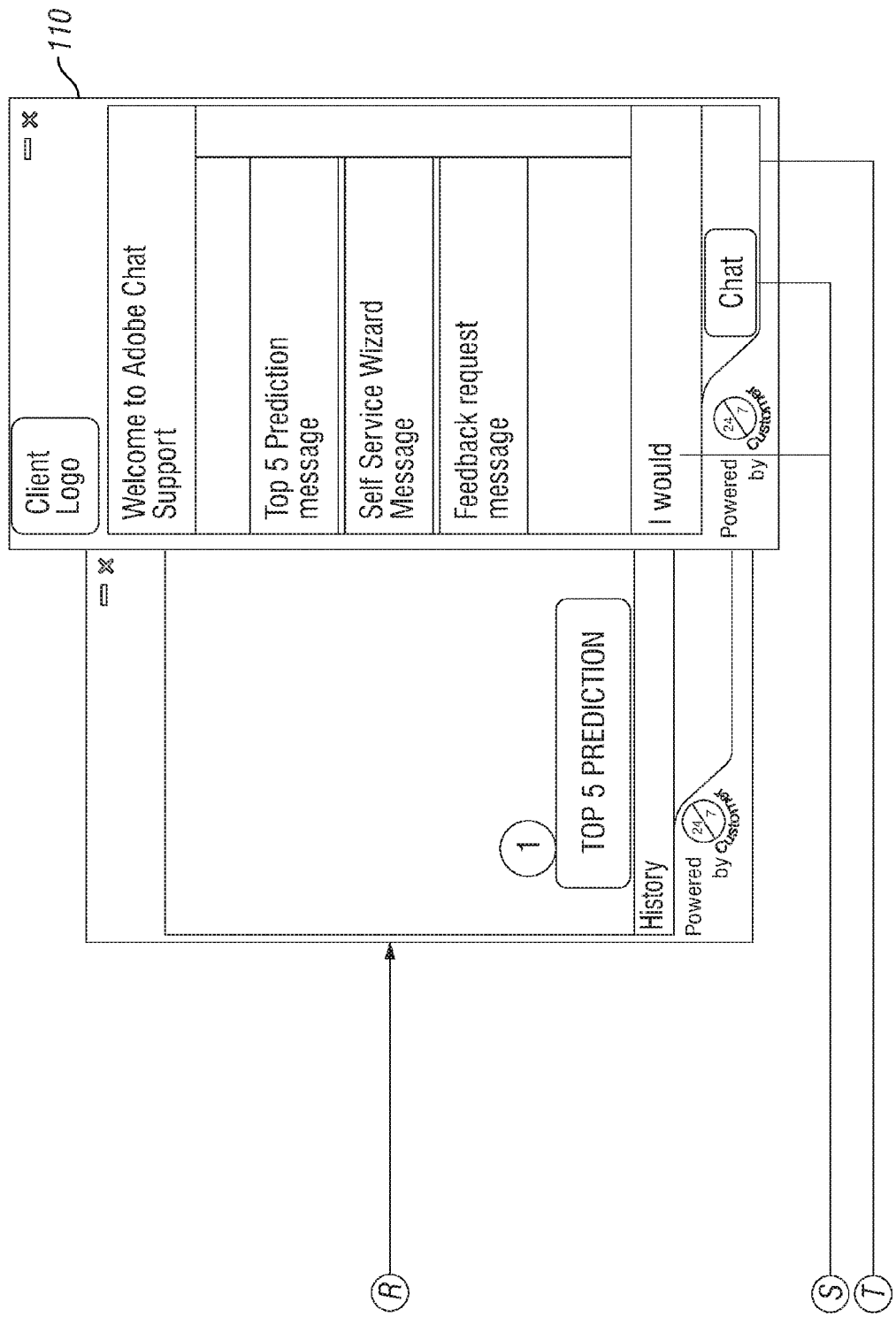
Figure 4C:
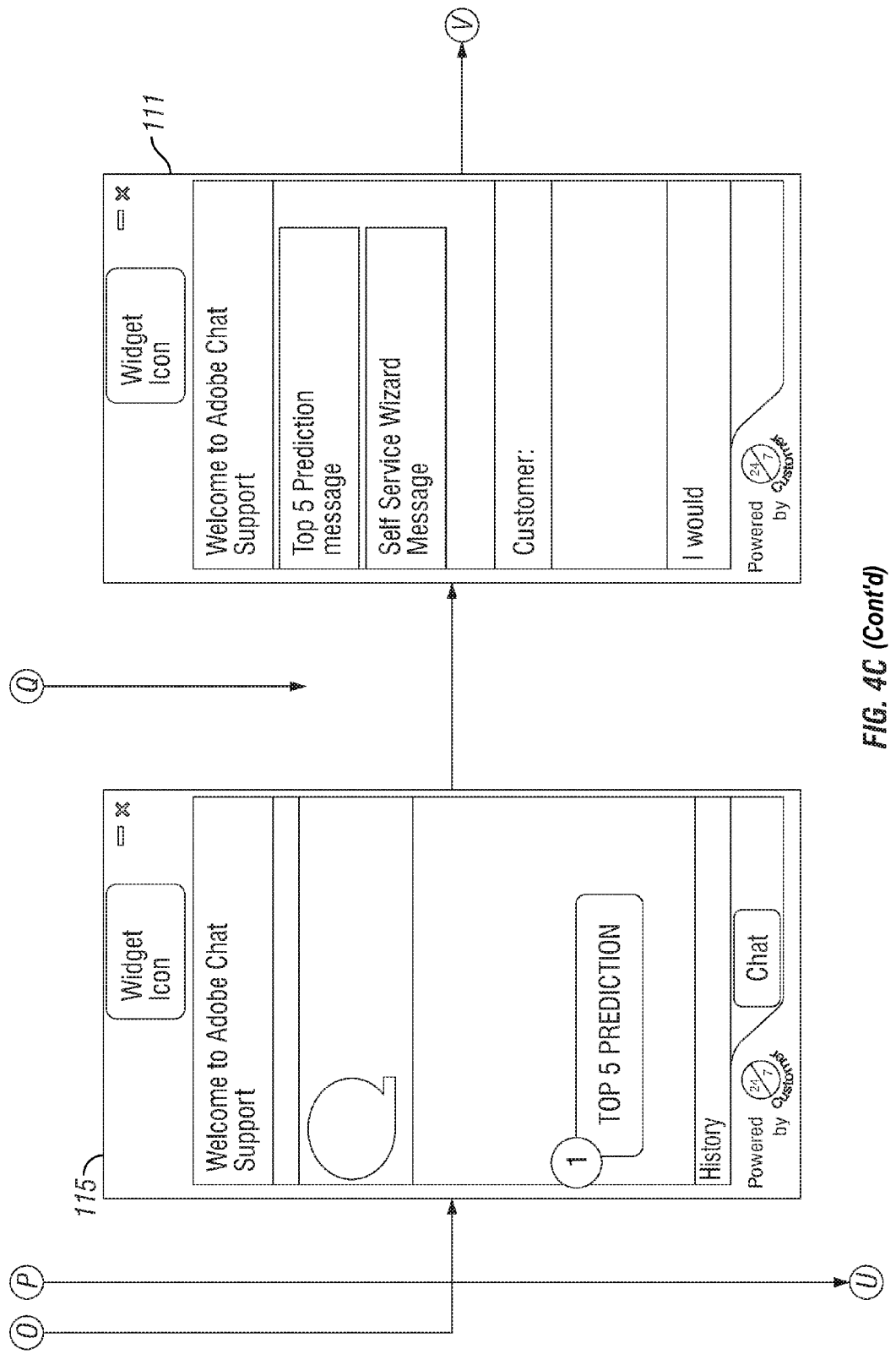
Figure 4C:
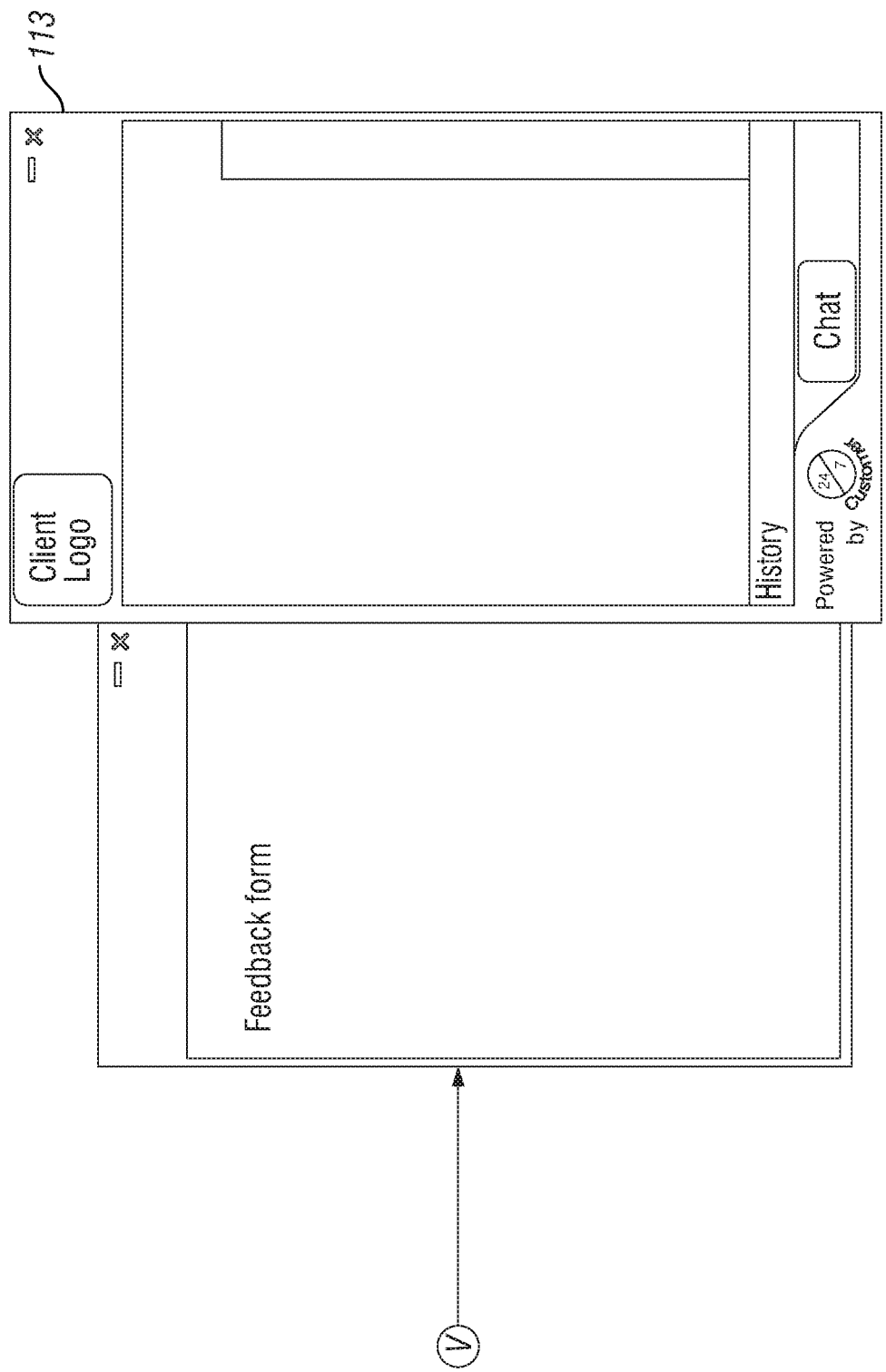
Figure 4C:
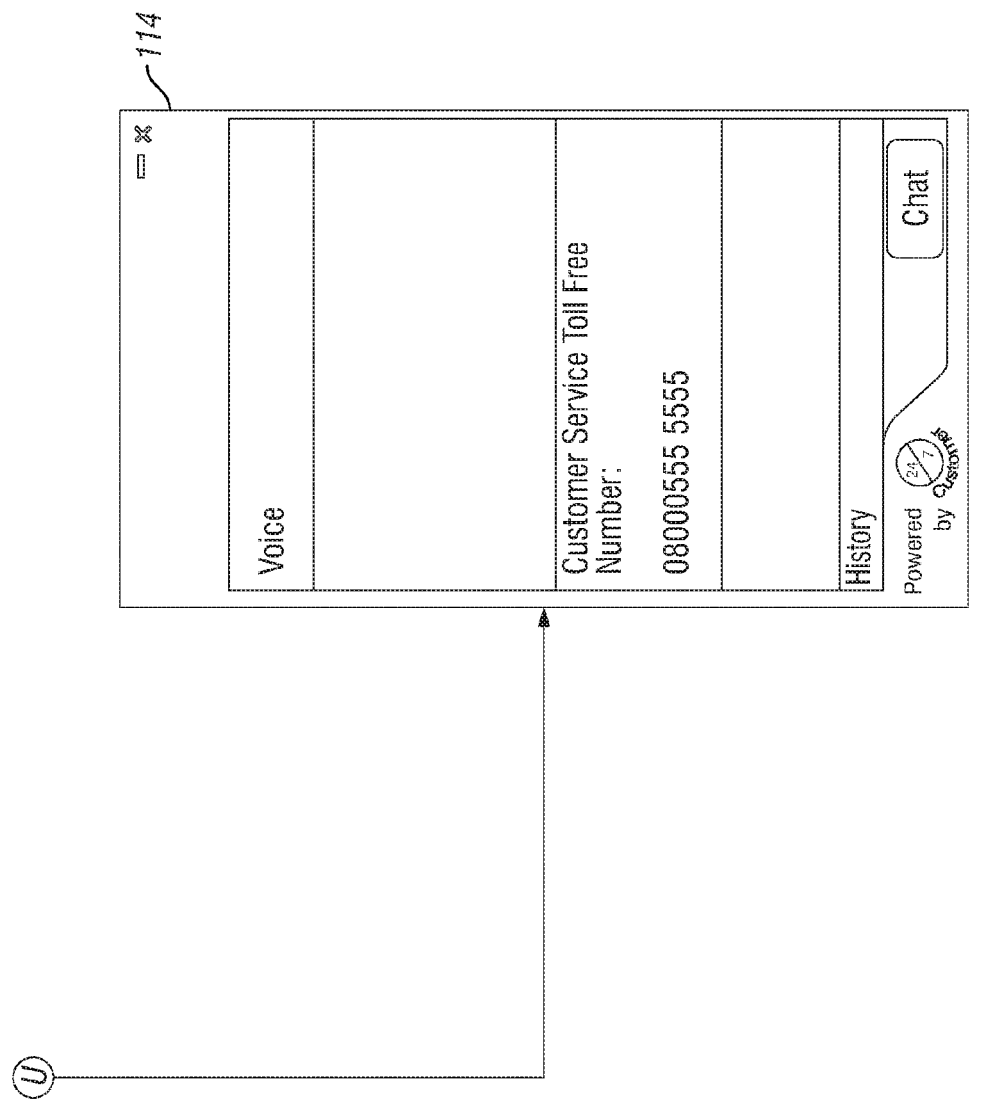

FIGS. 4A-4C are flow diagrams showing a process flow for a smart chat session according to the invention.

In FIG. 4A, a visitor (Customer) clicks on a website (100). A multimedia chat widget slides down and is displayed to the visitor (1010). The widget is triggered, for example, by business logic or by a click on chat button.

A welcome message is displayed and a pre-chat request form is presented to the visitor (102). At this point, the visitor can select a voice session (see FIG. 4C: 114). Otherwise, the pre-chat form is presented in the slide out area (103). At this point, the visitor can select a chat session (see FIG. 4C: 115). Otherwise, a submit button is provided in the pre-chat form and a pre-chat form icon appears in the history bar after the form has been submitted by the visitor. The pre-chat form is not mandatory in all embodiments of the invention.

A 'thank you' message is displayed to the visitor after the pre-chat form is submitted (104). The visitor can view the submitted form by clicking the icon in the history bar. Business logic generates and presents the visitor with a top five prediction message regarding the visitor request. Those skilled in the art will appreciate that any number of predictions can be included in the message. To chat, the visitor types a message in the message box, or the visitor can click on the chat button.

In FIG. 4B, the top five predictions are displayed in the slider to the visitor (105). At this point, the visitor can select a voice session (see FIG. 4C: 114). Otherwise, the prediction icon is also displayed in the history bar. To advance the session, the visitor clicks on a problem. At this point (106), the visitor can select a chat session (see FIG. 4C: 115). Otherwise, a self service message is displayed that requests the visitor to view the self service wizard.

The self service wizard is then displayed in the slider (107). At this point, the visitor can select a chat session (see FIG. 4C: 115). If the user proceeds with the self service wizard, the first part of the slide out contains the prerequisites which list out the information that the visitor needs to have handy. The second part of the slide out shows the steps. The steps to be followed in a tabbed interface having arrows at both ends. After the visitor is done, he submits the self service wizard, the self service icon display is then displayed in the history bar.

A resolution question is then displayed (108). The visitor is provided with a 'yes' and 'no' option with regard to resolution. At this point, the visitor can select a voice session (see FIG. 4C: 114).

In FIG. 4C, a feedback request message is displayed (109). A feedback form is displayed in the slider and a submit button is provided. After the feedback form is submitted, the feedback form icon is displayed in the history icon. At this point, the visitor can select a chat session 111.

A 'thank you' message is displayed in the slider (110). The visitor is provided with the option of viewing another prediction and a link to the top five predictions is provided. At this point, the visitor can select a chat session 111.

If a voice session is requested (see FIGS. 4A and 4B), a toll free number is displayed for contacting the company (114).

If a chat session is requested, as shown in FIGS. 4A and 4B, then the chat option is displayed to the visitor (115). An 'any other problem' message is also displayed in the slider and a top five predictions link is displayed.

Once a chat session is requested, the slide out is immediately closed and a pop up is provided for chat (111). The chat screen is typically presented using a familiar chat metaphor. However, the previous history is still reflected in the chat window.

After the chat conversation, the agent requests that the visitor fill out a feedback form (113). The feedback form is displayed in the slider, as well as a submit button. After the feedback has been submitted, the feedback icon is displayed on the history bar. If the visitor is not satisfied with the outcome of the session, the agent can suggest that the visitor click on the voice button to get a toll free number to call.

Computer Implementation

Figure 5:
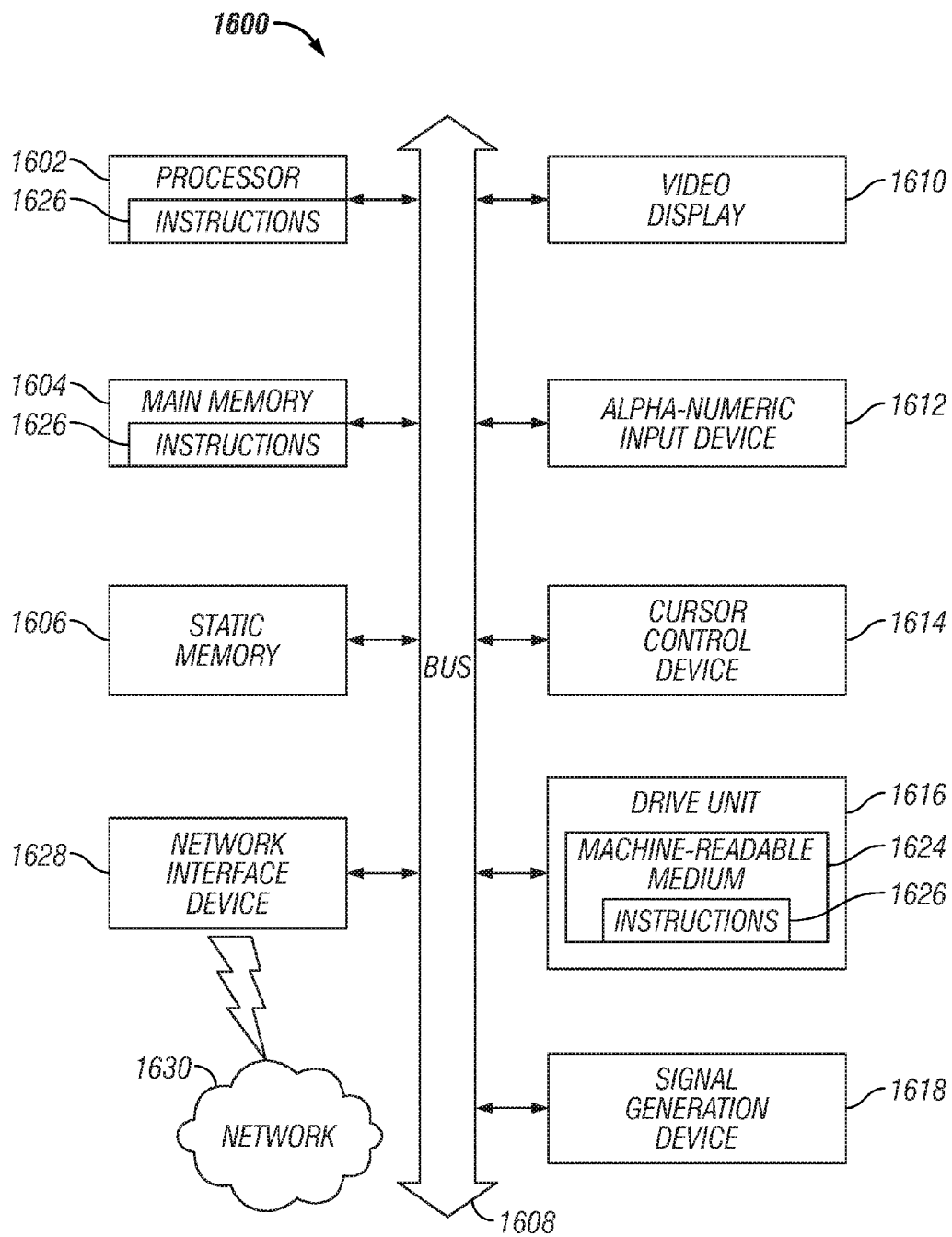
FIG. 5 is a block schematic diagram of a machine in the exemplary form of a computer system within which a set of instructions for causing the machine to perform any one of the foregoing methodologies may be executed.

FIG. 5 is a block schematic diagram of a machine in the exemplary form of a computer system 1600 within which a set of instructions for causing the machine to perform any one of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus, comprising:
   a processor;
   a non-transitory computer readable storage medium having encoded thereon executable instructions that, when executed by said processor, cause said processor to perform the steps of:
   displaying a chat client on a user device, said chat client comprising a chat tool and chat content display area on the user device that is configured to allow user participation when a chat session is held between said user and an agent, said chat content display area displaying a chat session history with which said user tracks back previous steps carried out with said chat client;
   during said chat session, determining context, at least in part, based on user click stream data and, based upon said context of said chat session;
   based on said context, automatically displaying a processor implemented context sensitive display area on the user device that is separate from and, that is invoked independently of, said chat content display to present additional information to said user as an active dialog with the user when actuated during, and as part of, said chat session;
   said active dialog:
      providing to said user device and effecting on said context sensitive display area display of relevant questions to the user;
      receiving from said user device context sensitive display area receiving the user's answers entered thereon; and
      automatically determining from the user's answers received from the user's device and generating either a response that is provided to aid the agent in assisting the user, or additional information that is provided to the user that is relevant to the chat session.

2. The apparatus of claim 1, said context sensitive display area comprising an exit form.

3. The apparatus of claim 1, said context sensitive display area comprising a context determined presentation of problem resolution information provided in response to user interaction with said chat client to help said user in solving specific problems.

4. The apparatus of claim 3, said problem resolution information comprising a listing of resolutions for two or more problems in response to user interaction with said chat client.

5. The apparatus of claim 1, said context sensitive display area comprising a self-service step-by-step wizard.

6. The apparatus of claim 1, wherein said context sensitive display area is configured to be triggered by said chat agent during said chat agent interaction with said user to provide information and/or forms to said user.

7. The apparatus of claim 1, said chat client executing user actions other than an exchange of chat messages during a chat session.

8. The apparatus of claim 1, said chat session history comprising a history bar that provides an iconic representation of all previous user activities.

9. A computer implemented chat method, comprising:
   displaying, by a processor on a display in a visitor device facilitating browsing to a website, a chat area with which said visitor is automatically connected to a chat queue, and that is configured to allow said visitor to enter the visitor's side of a chat session and to view an agent's side of said chat session;
   said chat area displaying a chat session history with which said user tracks back previous steps carried out during said chat session; and
   during said chat session, said processor determining context, at least in part, based on user click stream data and, based upon said context of said chat session;
   based on said context, said processor automatically displaying on said display on said visitor device a context sensitive display area comprising a multimedia chat widget that is separate from, and that is invoked independently of, said chat area, to present additional information to said visitor as an active dialog with the visitor when actuated during, and as part of, said chat session, wherein visitor interaction with, and content of, said chat widget is independent of visitor interaction with, and content of, said chat area;
   said active dialog:
      providing to said user device and effecting on said context sensitive display area display of relevant questions to the user;
      receiving from said user device context sensitive display area the user's answers entered thereon; and
      automatically determining from the user's answers received from the user's device and generating either a response that is provided to aid the agent in assisting the user, or additional information that is provided to the user that is relevant to the chat session.

10. The method of claim 9, further comprising:
    generating and displaying, by said processor, a list of top predictions regarding a visitor's request to the visitor in said chat widget;

advancing, by said processor, a session in response to said visitor selecting an entry in said list.

11. The method of claim 10, further comprising:
displaying, by said processor, in response to the visitor selecting an entry on said list, a self-service wizard in said chat widget.

12. The method of claim 11, comprising:
a first part of said chat widget displaying prerequisites which identify information that the visitor needs to have available to continue the chat session; and
a second part of the chat widget displaying steps to be followed by the visitor in connection with said visitor's request.

13. The method of claim 12, further comprising:
displaying a self-service icon display in the history bar in response to the visitor submitting the self-service wizard.

14. The method of claim 9, further comprising:
displaying, by said processor, a resolution question to the visitor and, responsive to said visitor's entry, displaying a feedback request message and a submit button to the visitor by said visitor; and
displaying a feedback form icon in the history icon after the feedback form is submitted.

* * * * *